United States Patent [19]

Stotz et al.

[11] Patent Number: 4,624,152
[45] Date of Patent: Nov. 25, 1986

[54] CLUTCH ACTIVATING DEVICE

[75] Inventors: Erich Stotz, Rommelshausen; Reinhard Horn, Wietnsheim, both of Fed. Rep. of Germany

[73] Assignee: Dr. Ing. h.c.F., Porsche Aktiengesellschaft, Weissach, Fed. Rep. of Germany

[21] Appl. No.: 733,787

[22] Filed: May 14, 1985

[30] Foreign Application Priority Data

May 14, 1984 [DE] · Fed. Rep. of Germany ....... 3417814

[51] Int. Cl.$^4$ .............................................. G05G 1/04
[52] U.S. Cl. ........................................ 74/518; 74/512; 192/99 S; 192/110 R
[58] Field of Search ................ 74/512, 516, 517, 518; 192/99 S, 110 R

[56] References Cited

U.S. PATENT DOCUMENTS

| | | | |
|---|---|---|---|
| 2,096,151 | 10/1937 | Watt | 192/99 S |
| 3,014,381 | 12/1961 | Frank | 74/512 |
| 3,199,366 | 8/1965 | Herrington, Jr. | 192/99 S |
| 3,261,438 | 7/1966 | Binder | 74/516 |
| 3,439,557 | 4/1969 | Bookout | 74/512 |
| 4,372,178 | 2/1983 | Ota | 74/516 |

Primary Examiner—Albert J. Makay
Assistant Examiner—Steven E. Warner
Attorney, Agent, or Firm—Barnes & Thornburg

[57] ABSTRACT

An activating device, in particular a clutch activating device for vehicles equipped with a clutch pedal mounted on a stationary pivot. The clutch pedal is connected to a drive mechanism controlling the activating force of the pedal. The drive mechanism includes a control lever on which an intermediate lever connected to the clutch pedal is held. The drive mechanism includes a first lever joint with the control lever, which is acted upon by a compression spring and which is swivel mounted on a stationary pivot, as well as the attached intermediate lever. This forms a second lever joint with an activating lever of the pedal. The assembly forms an increasing effective lever arm when the pedal is depressed such that the activating force of the clutch pedal is maintained at a substantially constant level for at least a portion of the clutch disengaging process.

8 Claims, 8 Drawing Figures

CLUTCH ACTIVATING DEVICE

BACKGROUND AND SUMMARY OF THE INVENTION

The invention relates to an activating device for activating the clutch of a motor vehicle. More particularly, the present invention relates to a clutch activating device which is able to maintain a constant activating force on the clutch during the disengaging action of the clutch.

German Patent Publication No. 2,303,538 describes a clutch activating device which has a drive mechanism acted upon by a spring to reduce the activating force during the swivel action of the pedal. The direction of the draw spring is reversed, with respect to the pedal, once a dead point position has been transgressed. The activating force can then be reduced. The spring is not encased and extends unprotected into tne engine area. The spring is held between a projecting control lever and a structurally rigid bearing support. This design requires a relatively large space and has disadvantages because when the pedal is activated, the space requirements are even greater.

The object of the present invention consists of creating an activating device of the described type which avoids these disadvantages and enables the creation of such a device with a compression spring with which it is possible to reduce and to maintain almost constant the activating force during a portion of the disengaging process of the clutch by means of a small structural unit which is simple to install whereby the spring is supposed to be functionally safe and encased.

According to the present invention, a structurally simple, easy to install and assemble, and very safe clutch activation device is provided which significantly reduces the activating force during the clutch disengaging process because of the change in the lever configurations on lever joints, providing easier operating conditions. One advantage of the device presented by the present invention consists of the fact that a relatively narrow unit is possible as a result of the flat design which is parallel to the pedal bearing axis. Because of the single, relatively short intermediate lever, the unit can be installed without large space requirements and does not require more space when activated.

In accordance with one feature of the present invention, the lever joints and the spring are designed in such a way that the activating force remains relatively constant at a pressed distance of, for example, 30 mm with only slight pedal swivel action and this is reduced further until complete spring action is achieved.

In accordance with another feature of the present invention, the control lever has a curve-shaped arc in which the intermediate lever is force guided. A constant activating force is achieved with this curved guidance of the intermediate lever so that foot action is more responsive.

The lever joints and the spring can be adjusted aporopriately to adapt the lever configurations and the moment of support to the various couplings. Adjustment is also achieved by an eccentric adjustment device. Any possible tolerances can be compensated and the force action of the spring can be changed.

Further objects, features, and advantages of the present invention will become more apparent from the following description when taken with the accompanying drawings which show, for purpose of illustration only, embodiments in accordance with the present invention.

DETAILED DESCRIPTION OF THE DRAWINGS

Figure 1:
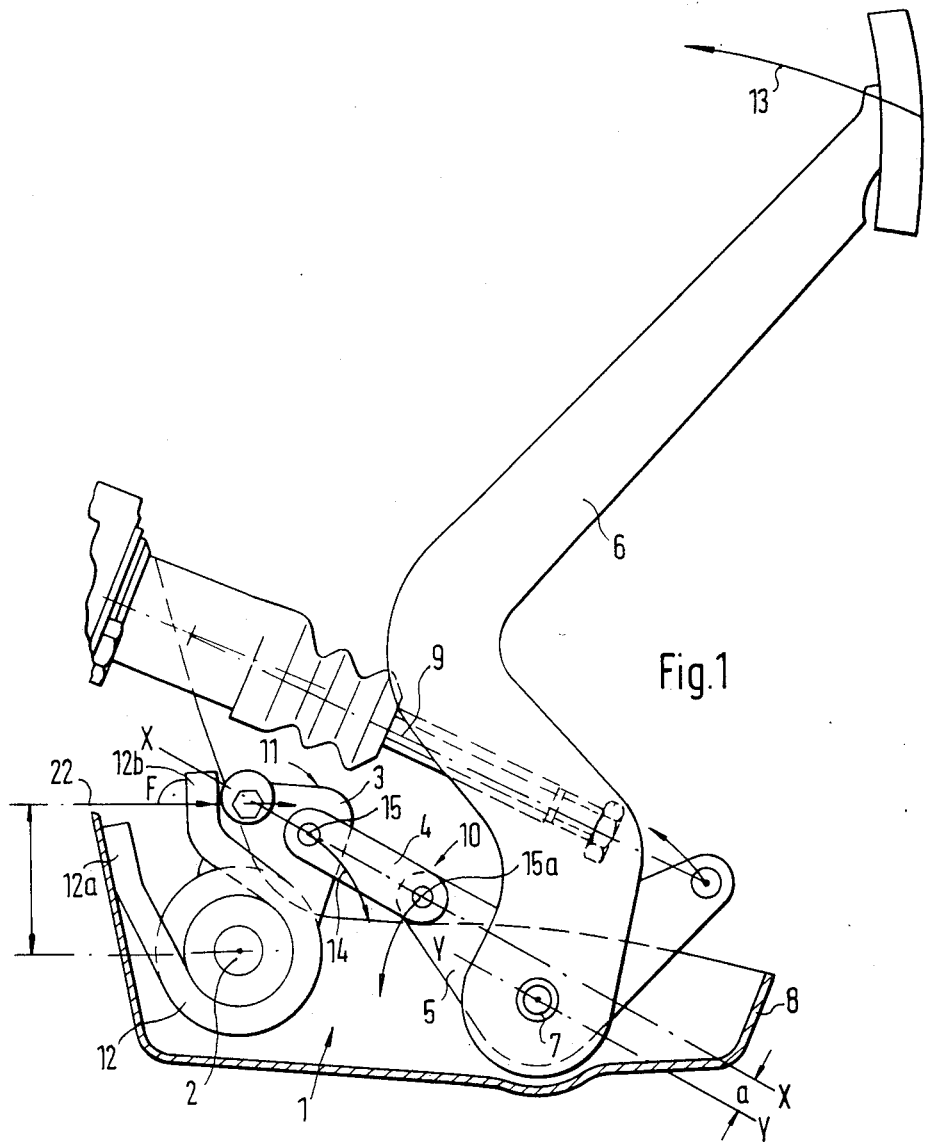
FIG. 1 is a side elevation showing an activating device for a clutch pedal in the engaged position.

The activating device includes a drive mechanism 1 with a control lever 3 in contact with a stationary pivot 2 on the structure side. The control lever 3 is swivel mounted and connected to an intermediate lever 4 which in turn is held in place at an activating lever 5 of the pedal 6 and which can turn. The pedal 6 is positioned in a base bearing 7 of the structure 8. A rod 9 is connected to the pedal 6. The rod acts upon a disengagement lever of a coupling, which is not shown.

The drive mechanism 1 includes two inter-connected lever joints 10 and 11. The first lever joint 11 consists of the control lever 3 and the intermediate lever 4 which forms the second lever joint 10 with the activating lever 5 of the pedal 6. A compression spring 12 is connected to the control lever 3. The compression spring 12 attempts to swivel the control lever 3 in the turning direction 14 when the pedal is activated in the direction of the arrow 13.

As is clearly depicted in FIG. 1, the swivel axes 15 and 15a as well as the contact point of the spring 12 at the free end of the control lever 3 are positioned on about the same plane X—X above another parallel plane Y—Y which leads through the pedal bearing axis 7. This axial design results in a negative lever arm a between the two axes 15 and 15a and the pedal bearing axis 7 which acts against the swivel motion (arrow 13) of the pedal 6.

Figure 2:
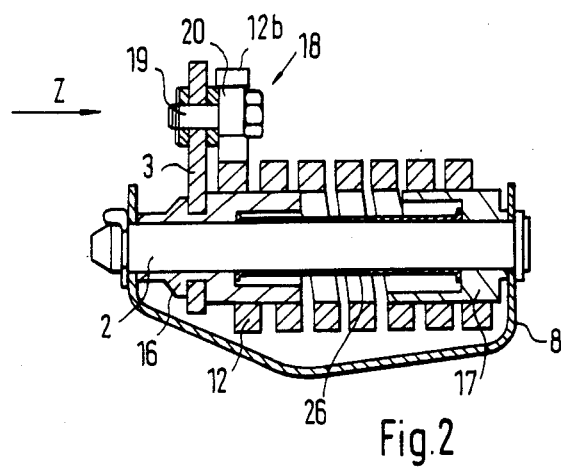
FIG. 2 is a vertical transverse section of tne spring and the control lever of the activating device.

As can be clearly seen in FIG. 2, the pivot 2 is formed by a bolt secured on the structural side. The bolt is positioned parallel to the pedal bearing axis 7. The spring 12 is coaxially held and guided on this bolt to rotating casings 16, 17 at either end of the bolt. The control lever 3 is firmly connected to the casing 16. A shank spring is used as the spring 12 which supports its one shank 12a on the structure 8 and the other shank 12b on the control lever 3. A clearance casing 26 is provided between the two casings 16 and 17.

An eccentric adjustment device 18 (FIG. 2) is provided at the control lever 3. The spring 12 contacts the adjustment device 18 across the shank 12b. This adjustment device 18 essentially contains a bolt 19 to which an eccentric piece 20 is secured. By turning the eccentric piece 20 tolerances can be compensated and the tension of the spring 12 can be increased.

The spring 12 has a line of action 22 which runs at about a right angle to the spring shank 12b and is above the swivel axis 15 of the control lever 3 and the intermediate lever 4.

As shown in FIG. 1 and FIGS. 5 to 8, the two lever joints 10 and 11 are designed in such a way that a gradually increasing lever arm results when the pedal is moved in the direction of arrow 13. As a result, reduced activating force is achieved.

Figure 4:
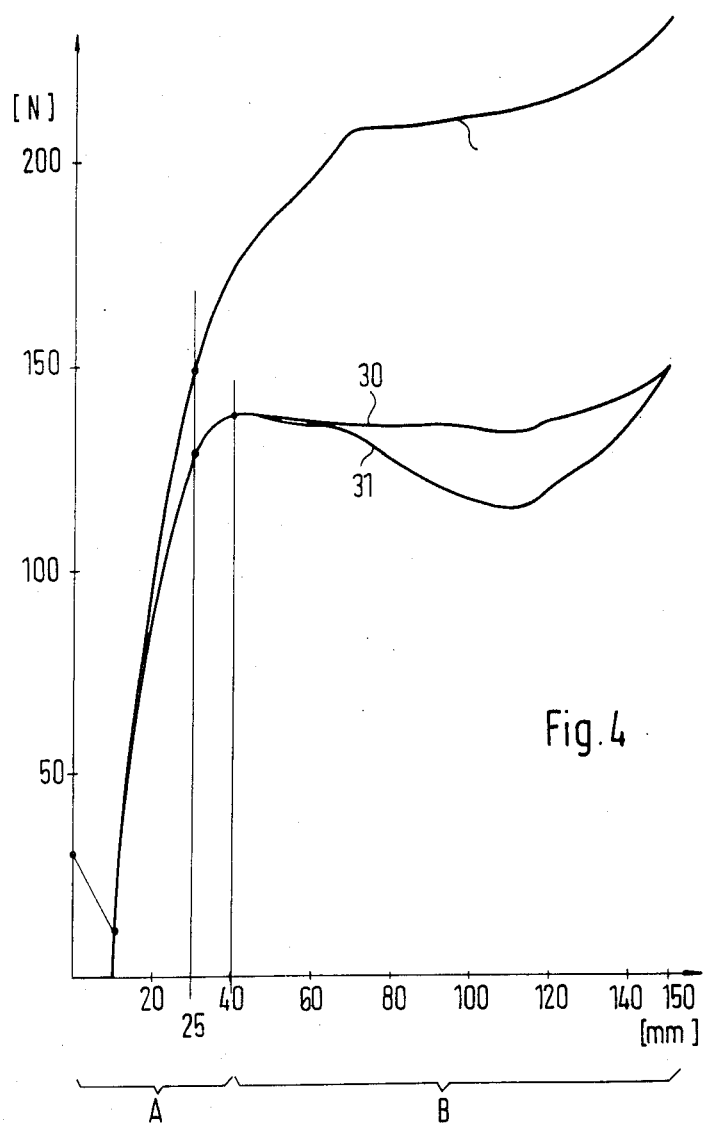
FIG. 4 is a force action graph.
Figure 5:
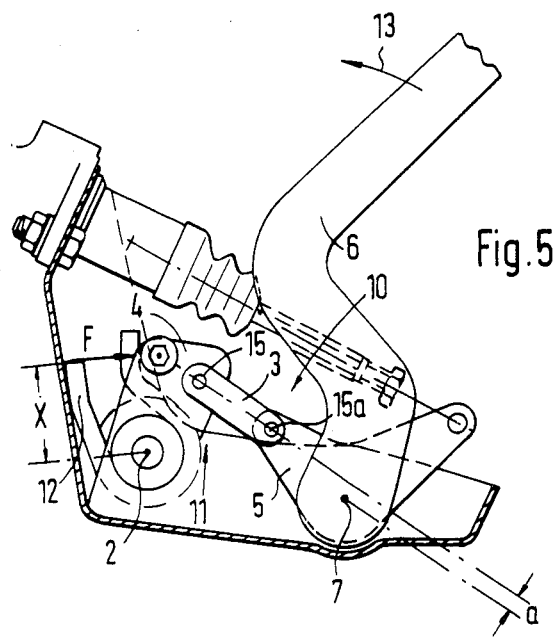
FIGS. 5, 6, 7, and 8 are side elevations of the actuating device showing the change in lever arm configurations of both lever joints from a clutch engaged position to a clutch disengaged position of the pedal.
Figure 6:
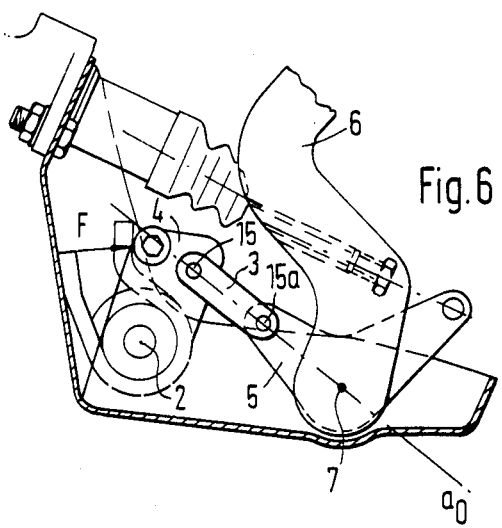
Figure 7:
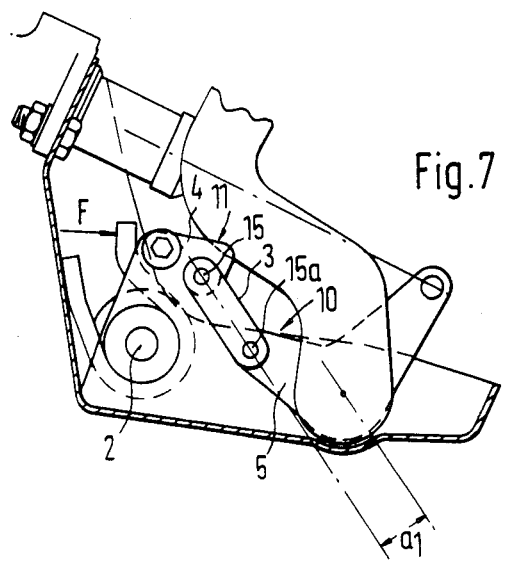

FIG. 5 shows the pedal 6 in a clutch engaged position in which a lever arm a forms at the lever joint 10 and a slightly changed lever arm X adjusts to the force F applied by the spring 12. Once tne dead point position (FIG. 6) is passed, a lever arm $a_1$ is formed (FIG. 7). As can be seen from the graph (FIG. 4), the activating force of the pedal reduces when clutched because of the adjusting moment of support resulting from the spring force. For example, at a pedal depression of 25 mm the normal pedal activating force would be 150 N. With the device presented by the present invention, a reduced pedal activating force of 130 N is achieved.

Figure 8:
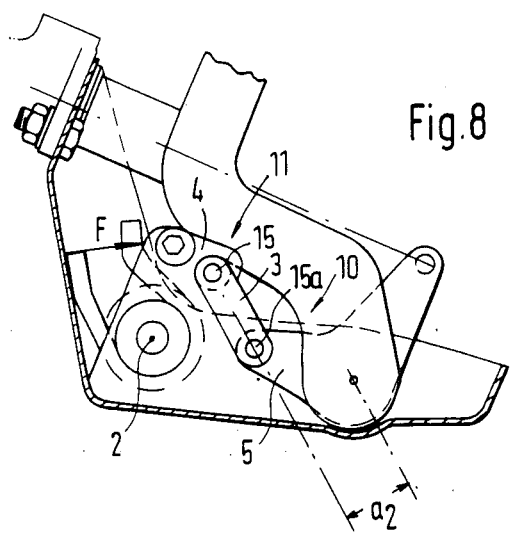

The lever arm $a_1$ lengthens with continued pedal movement to $a_2$ (FIG. 8). As the graph shows, for example, at a pedal action of around 40 mm almost the maximum activating force is reached as is shown in curve 31. The spring characteristics of the shank spring 12 as well as the selected lever configurations of the two lever joints 10 and 11 make it possible that the moment of support on the pedal 6 produced by the spring 12 for reducing the activating force in a first section A of the swivel action (using the example of 40 mm pedal depression, FIG. 4) has a lower force reduction of the activating force than in a second section B of the swivel action. In this second section B the force reduction is about constant for a small swivel action and then a greater force reduction ensues. The force reduction curve 31 is essentially achieved by a force of the spring 12 which reduces with the swivel action of the pedal 6 and by the extending lever arm from $a_0$ to $a_2$.

Figure 3:
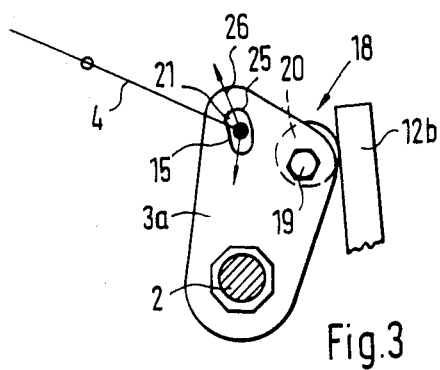
FIG. 3 is a transverse section in direction Z of FIG. 2, showing the control lever with the curve-shaped arc and the eccentric adjustment device.

In another embodiment of the present invention, a control lever 3a (FIG. 3) is designed with a curve-shaped opening 25 in which the intermediate lever 4 is force guided across a bolt. As is shown in the graph (FIG. 4), in the first section A of the swivel action, the force reduction is about the same as with the control lever 3 without the arc path for a pedal depression of 40 mm. In the second section of the swivel action B the force reduction of the activating force is held about constant for the remaining swivel action, as is shown in curve 30 of the graph (FIG. 4), by the rapid increase of the lever arm when the pedal is pressed down. This is due to a shift in the intermediate lever 4 with its swivel axis 15 in the direction of arrow 26.

The graph (FIG. 4) contains the corresponding values of the pedal swivel action and of the pedal force for the purpose of describing the invention more clearly. By constructively changing the lever joint lengths in the appropriate fashion as well as the spring force, it is possible to adjust the values provided as an example to the requirements so that the characteristics of the curves 30 and 31 remain the same in sections A and B but the absolute values change.

Although the invention has been descrioed in detail with reference to a preferred embodiment and specific examples, variations and modifications exist within the scope and spirit of the invention as described and defined in the following claims.

What is claimed is:

1. A clutch activating device for vehicles having a clutch pedal which is pivotably mounted to a support structure, comprising:
   a pivotable control lever acted upon by a compression spring,
   a first lever joint formed by the control lever and an intermediate lever, and
   a second lever joint formed by the intermediate lever and an activating lever of the pedal,
   wherein an effective lever arm is defined by a perpendicular distance between a line of force extending through the first and second lever joints and a pivot axis of the clutch pedal,
   wherein spring characteristics of the compression spring are selected and the lever joints are configured such that an activating force of the pedal is reduced in a first portion of a pivotable activating movement, and such that the force is further reduced in a second portion of said movement, and such that the activating force in said second portion is at least initially substantially constant.

2. The clutch activating device of claim 1, wherein the control lever includes a curved opening and wherein this opening guides the intermediate lever in such a way that the lever arm (a) is extended in the second portion of the pedal movement such that a constant reduction of the activating force is maintained.

3. The clutch activating device of claim 1, wherein the intermediate lever is pivoted around both first and second lever joints when the pedal is moved in the clutch disengaging direction such that the lever arm extends continuously from a dead point $a_0$ to a distance $a_2$.

4. The clutch activating device of claim 1 wherein said spring includes at least one shank and wherein a line of action of the spring is substantially at a right angle to one of said shanks of the spring and is above a pivot axis of the control lever.

5. A clutch activating device for vehicles having a clutch pedal which is pivotably mounted to a support structure, comprising:
   a pivotable control lever acted upon by a compression spring,
   a first lever joint formed by the control lever and an intermediate lever, and
   a second lever joint formed by the intermediate lever and an activating lever of the pedal,
   wherein an effective lever arm (a), defined by a perpendicular distance between a line of force extending through the first and second lever joints and a pivot axis of the clutch pedel, is formed such that, when the pedal is depressed, an activating force of the pedal is substantially constant throughout a portion of a clutch disengaging process,
   wherein the two lever joints and a contact point of the spring at the control lever are positioned in substantially the same plane which lies above a parallel plane extending through a pedal bearing axis when the pedal is in the clutch-engaged position.

6. A clutch activating device for vehicles having a clutch pedal which is pivotably mounted to a support structure, comprising:
   a pivotable control lever acted upon by a compression spring,
   a first lever joint formed by the control lever and an intermediate lever, and
   a second lever joint formed by the intermediate lever and an activating lever of the pedal,
   wherein an effective lever arm (a), defined by a perpendicular distance between a line of force extending through the first and second lever joints and a pivot axis of the clutch pedal, is formed such that, when the pedal is depressed, an activating force of the pedal is substantially constant throughout a portion of a clutch disengaging process,
wherein the pivot of the control lever defines a fixed axis which runs parallel to the clutch pedal axis and the compression spring is positioned coaxially on the pivot of the control lever with a first shank of the spring fixed to the support structure and a second shank of the spring is in contact with a free end of the control lever.

7. The clutch activating device of claim 6, wherein the free end of the control lever includes an eccentric adjustment device for contacting the second shank of the spring.

8. A clutch activating device for vehicles having a clutch pedal which is pivotably mounted to a support structure, comprising:

a pivotable control lever acted upon by a compression spring,
a first lever joint formed by the control lever and an intermediate lever,
a second lever joint formed by the intermediate lever and an activating lever of the pedal,
wherein an effective lever arm (a), defined by a perpendicular distance between a line of force extending through the first and second lever joints and a pivot axis of the clutch pedal, is formed such that, when the pedal is depressed, an activating force of the pedal is substantially constant throughout a portion of a clutch disengaging process,
said device further comprising first bearing case for securing the control lever and a second bearing case for containing the compression spring and a clearance case placed between the first and second bearing cases to assure proper terminal positions.

* * * * *